Nov. 11, 1969  J. A. LAPOINTE  3,477,484
WOOD WAFERING
Filed Feb. 12, 1968
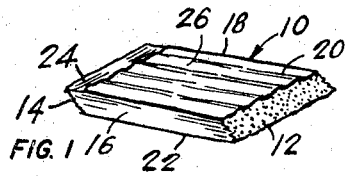
FIG. 1
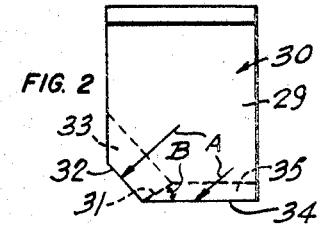
FIG. 2
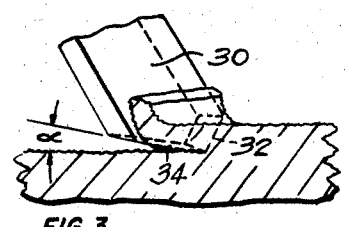
FIG. 3
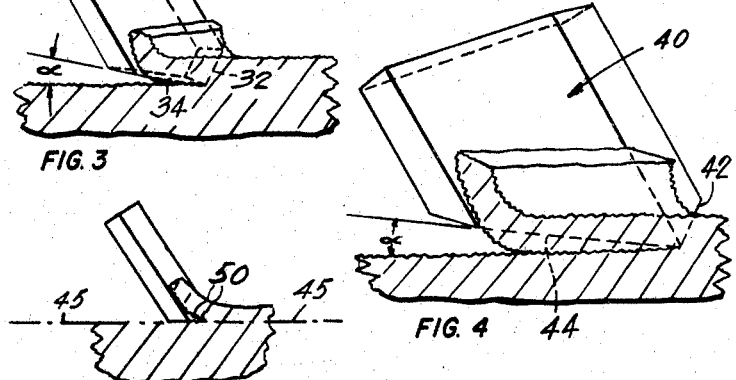
FIG. 4
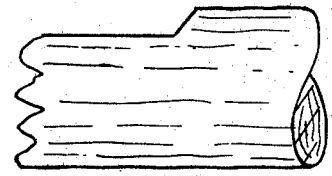
FIG. 5A
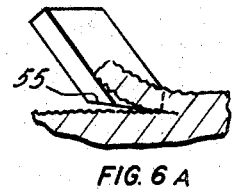
FIG. 6A
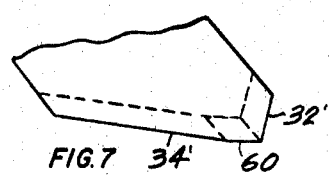
FIG. 5B   FIG. 7
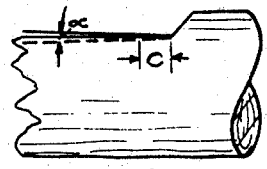
FIG. 6B
*INVENTOR*
Joseph Andrew LAPOINTE
*PATENT AGENT*

United States Patent Office 3,477,484
Patented Nov. 11, 1969

3,477,484
WOOD WAFERING
Joseph Andrew Lapointe, Pointe Claire, Quebec, Canada, assignor to Domtar Limited, Montreal, Quebec, Canada, a Canadian company
Filed Feb. 12, 1968, Ser. No. 704,700
Claims priority, application Canada, Feb. 25, 1967, 983,818
Int. Cl. B27l *11/00*
U.S. Cl. 144—326     2 Claims

ABSTRACT OF THE DISCLOSURE

A method of producing wood wafers by a first cut across the grain and a second cut substantially parallel to the grain extending part way across the wafer from adjacent the first cut, and splitting along the grain from the second cut to the free edge of the log to free the wafer from the log.

---

The present invention relates to a method of fragmenting wood whereby a wood fragment of a novel type is formed and the quantity of pin chips and/or fines formed is reduced.

Generally, in commercial operation, wood wafers are separated from a log by cutting in at least two planes with a pair of co-operating cutting edges; one, the transverse edge cutting across the grain to the depth or thickness of the wafer to be separated, and the other, the main edge, cutting substantially parallel to the grain at said depth. Wafers are also sometimes separated by a single edge extending parallel to the grain at a depth equal to the thickness of the wafer to be produced. A third system of forming wood wafers is by severing the wood along three sides simultaneously to form trapezoidal wood fragments and a fourth system uses prescorers in combination with a flat knife.

All of the above methods produce wafers having one main plane surface and result in the formation of a considerable number of pin chips and fines. The present invention provides a system of wafering which retains control of the wafer thickness without appreciable end damage to the wafers, as was possible with the prior art techniques, but further teaches the formation of wafers having both the main surfaces uneven rather than plane as in the prior art wafers and thereby reducing the number of pin chips and fines formed.

Broadly, the present invention comprises; cutting across the grain to a depth equal to the thickness of the wafer to be produced, severing substantially in the grain direction for a minor portion of the length of the wafer and splitting along the grain for the remainder of the length of the wafer thereby to separate the wafer from the wood.

Further features, objects and advantages of the present invention will be evident from the following detailed description taken in conjunction with the accompanying drawings in which:

FIG. 1 is a typical chip formed according to the present invention.

FIG. 2 is a plan view of one knife for use in the present invention illustrating the angle of the parting edge to the direction of movement of the knife.

FIG. 3 is a schematic end view of the knife of FIG. 1 cutting across at an angle to the grain and splitting the wood parallel to the grain to separate the wafer from the wood.

FIG. 4 is a view similar to FIG. 3 but using a wing knife in place of the flat knife of FIG. 1.

FIGS. 5a and 5b schematically illustrate conventional operation in cutting wafers along two planes.

FIGS. 6a and 6b illustrate the relationship of the parting edge relative to the grain of the log when operating according to the present invention.

FIG. 7 shows another embodiment of a flat knife for use with the present invention.

Generally, the knives used for the present invention have a transverse edge and a parting edge. The transverse edge severs across and at an angle to the grain while the parting edge generally severs for only a minor portion of its length, since the wood is split along the grain to separate a wafer. Wafers formed according to the present invention are substantially parallelepipedic in configuration and are unique in that only the two end grain surfaces are cleanly cut from the wood; the other surfaces being formed substantially by splitting along the grain as will be described hereinbelow. Wafers formed by the present method have more surface area available for direct contact with cooking liquor due to the unevenness of the main faces.

The present invention provides a wood fragment wherein the two main faces are undulating and are formed by splitting in advance of the main edge of the knife. These uneven surfaces provide more area of contact for impregnation than is available on the substantially smooth wafer fragments cut by the prior art techniques. With the prior art technique the surfaces of the wafer were formed by severing across and along the grain while the present invention severs across the grain to a depth or thickness of the wafer to be produced, and for a short distance along the grain with the remainder of the separation along the grain occurring by splitting in the grain direction for the majority of the wafer length. The split automatically follows the line of least resistance which will be along the grain. When severing, as in the prior art, the wood is cut in the plane of the cutting edge thereby severing off the peaks of the undulations formed on the log by splitting in advance of the knife and it is these severed off peaks that contribute significantly to the total pin chips and/or fines produced.

As shown in FIG. 1, a wafer 10 of the present invention comprises; a pair of opposed end grain substantially flat cut faces 12 and 14, a pair of side edge faces 16 and 18 formed by splitting along the grain and a pair of opposed main surfaces 20 and 22 formed by an initial cut with the majority of the surface formed by splitting along the grain. The surface 20 has a severed section 24 which is substantially flat and a main uneven of undulating surface section 26 which is formed by splitting along the grain. The second section 24 generally will not exceed 25% of the area of surface 20 and preferably is less than about 15%. It is difficult to reduce this area 24 below about 5% of the surface. Obviously, the surfaces 22 will also be divided into a pair of surface areas similar to the surfaces 24 and 26 described above. This may be contrasted with prior art wafers wherein both main surfaces are substantially flat or, as in some cases with splitting in advance of the knife, only one main face is substantially flat.

A knife 30 suitable for carrying out the present invention is shown in FIG. 2. This knife 30 has a transverse cutting edge 32 and a parting edge 34 extending at an angle from one end of the transverse edge and terminating in a free end at the opposite side of the knife from the edge 32. An alternate knife, namely a wing type knife 40 having a transverse edge 42 and a parting edge 44 extending at an angle from one end of the transverse edge 42 and terminating in a free end at the opposite side of the knife 40 from edge 42 is shown in FIG. 4. Any other suitable knife may also be used as, for example, the knife shown in FIG. 7 which will be explained hereinbelow. The edge 32 (or 42) severs across the grain while the edge 34 (or 44) severs only when splitting is not effective, i.e., when a knot or the like is encountered.

Suitable wafers contemplated for operation using the present invention for example may be similar in principle to those disclosed in U.S. Patents 3,216,470, Nov. 9, 1965 — Nilsson; 2,889,859, June 9, 1959 — Johnson; 664,031 May 28, 1963—Logan et al., or any other suitable chipping arrangement.

Each of the knives 30 (or 40) is oriented so that the transverse edge 32 (or 42) leads the knife into the wood and cuts across the grain to the desired depth and the parting edge 34 (or 44) angles rearwardly from the leading edge 32 (or 42) to the free end of the parting edge 34 (or 44). Preferably, when using a flat knife 30, the transverse cutting edge 32 is substantially perpendicular to the direction of travel (arrow A). Thus, in operation the wood is severed by the edge 32 (or 42) and for a short distance by edge 34 (or 44) and is split along the grain to the free edge of the wood by the wedging action of the knife as will be described in detail hereinbelow.

As shown in FIG. 3 (and 4) the parting edge 34 (or 44) is arranged with its free end positioned above the depth of penetration of the end of edge 34 (or 44) adjacent edge 32 (or 42). Generally, the edge 34 (or 44) lies at an angle $\alpha$ of about 2 to 25° outward from the grain or axis of the log, depending on the thickness and length of the wafer. Preferably, this angle will be between about 5 and 10° so that the majority of the surfaces 20 or 22 of the wafers are not cut (i.e., to maintain the surface areas 24 as small as possible). If the angle $\alpha$ is too shallow, substantially all of the surfaces 20 or 22 will be cut and pin chip formation will be relatively high (i.e., the surface area 24 will be too large). On the other hand, if the angle $\alpha$ is too steep the edge 34 (or 44) will be too far above the line of splitting and will not effectively sever any knots or the like that are not fractured by the splitting action. Thus the major portion of the edge 34 severs only as a safety feature and cuts any knots or the like that are not freed by the splitting action of the knife. As above indicated, the major portion of the edge 34 is generally above the line of separation formed by the splitting action of the knife.

The wafers of the present invention are formed by severing across the grain with the transverse edge 32 (or 42) and splitting the wafer from the wood by the wedging action of the body of the knife. This wedging action is obtained by orientation of the body of the knife relative to the cutting direction. The orientation is determined by the grind angle of edge 34 (i.e. the angle between the main surface 29 of the knife and the ground plane 35 trailing the edge 34) and the tracking angle of the knife as will be more fully described hereinbelow.

The angle between the main surface 29 of the knife and the ground plane 35 trailing the edge 34 establishes the angle of surface 29 to a surface formed by cutting with edge 34 (allowance being made for the cutting clearance and the angle $\alpha$). The grind angle of edge 34 thus determines the angle the wafer must ride up as it is cut by edge 32 (or 42) and in part determines the wedging action applied to split the wafer from the log. This grind angle may be any conventionally used angle and preferably is in the range of 30–45°.

The tracking angle $\beta$ of the knife is defined as the angle between the parting edge 34 (or 44) and the junction line formed between the ground plane 33 trailing the edge 32 (or 42) and the ground plane 35 trailing the edge 34 (or 44) measured in the plane 35 (see FIG. 2). Since the junction line 31 must be substantially aligned with the direction of relative movement between the knife and the wood, i.e., the direction of cut (allowance being made for cutting clearance, see arrows A, FIG. 2), the tracking angle $\beta$ determines the angle of edge 34 to the direction of movement. This tracking angle $\beta$ should be less than about 70° and preferably less than about 60° and greater than about 40° so that the edge 34 (or 44) angles backward relative to the direction of movement and the junction line 31 toward the free end of the edge 34. Thus the transverse edge 32 (or 42) leads the knife into the wood and the edge 34 angles backward relative to the direction of travel at an angle of less than 70°, preferably 60–40°. Should the tracking angle $\beta$ be too small a relatively long edge 34 will be required for any given length of wafer, the splitting action may be rendered insignificant and the body of the knife trailing edge 32 will be too thin thereby reducing knife life. If the angle $\beta$ is too large the splitting action of the knife will be substantially lost and the edge 34 (or 44) will simply cut the wood and the benefits of the instant invention will be lost. Also with a flat knife the edge 32 may become ineffective for cutting to any appreciable depth.

In FIGS. 5a and 5b the prior art operation is illustrated. As can be seen, the plane 45 of the parting edge or main cutting edge is parallel to the grain and at the maximum depth, i.e., wafer thickness, in the log. In this operation splitting of the wood may occur adjacent the free edge of the wafer to form an uneven surface having ridges 50 as shown in FIG. 5a. The extent of splitting in prior art cutting is determined, among other things, by the species being cut and the grind angle of the main edge. The main cutting edge severs these ridges 50 forming pin chips or fines and a substantially flat surface on the wood. A comparison of FIGS. 5a and 5b with FIGS. 6a and 6b illustrates how applicant's invention leaves the ridges substantially intact. The majority of the plane of the parting edge shown at 55 in FIG. 6a (i.e. the edge 34 or 44) is above the ridges and therefore the number of pins chips formed is reduced and a substantially undulating surface is formed on both main surfaces of the wafer.

In FIG. 6b the short section C is all that generally will be cut by the edge 34 (or 44), with the remainder of separation of the chip being accomplished by splitting due to the wedging and lifting action of the body of the knife. The short section C will correspond substantially to the area 24 described hereinabove.

Applicant has only shown two embodiments wherein the main edge is lifted above and the depth of cut by arranging the knife so that the main edge extends at an angle to the grain. It is evident that any suitable means may be provided for lifting the main edge from cutting position. A modification is shown in FIG. 7 wherein the edge 34 has been divided into two parts, a section 60 substantially parallel to the grain and a section 34' extending at an angle to the grain. The section 60 will cut to form a surface equivalent in length to that shown at 24 in FIG. 1 while the majority of section 34' will clear the wood, except in the case of a knot or the like.

While the disclosure has been directed to a wood wafer and the method of producing same, care must be taken in correlating the wood species with the size of wafer to be produced. Generally, in most softwoods, and some hardwoods, wafers ⅛ x 1″ may easily be produced using the instant invention. With some hardwoods, however, it may be necessary to shorten or thicken the chip, or both, in order to obtain the required controlled splitting along the grain. Also the angles $\alpha$ and $\beta$ may require some minor adjustment to obtain best results for different wood species.

Modifications may be made in the present invention without departing from the spirit of the invention as defined in the appended claims.

I claim:
1. A method of producing wood wafers comprising cutting with a first cutting edge a first cut across at an angle to the grain of a log to a depth substantially equal to the thickness of the wafer to be produced, cutting with a second edge a second cut substantially parallel to the grain at said depth and adjacent said first cut, for a distance of less than 25% of the length of the wafer to be produced and splitting said log along the grain from said second cut to a free edge on said log, thereby to free said wafer from said log.

2. A method as defined in claim 1 wherein said second cut extends in the grain direction for between 5 and 15% of the length of the wafer in the grain direction.

References Cited

UNITED STATES PATENTS 3,262,476  7/1966  Johnson _____ 144—176

GERALD A. POST, Primary Examiner

U.S. Cl. X.R.

144—320; 161—168